United States Patent
Aoshima et al.

(10) Patent No.: US 8,381,404 B2
(45) Date of Patent: Feb. 26, 2013

(54) METHOD MANUFACTURING OF FLUID DYNAMIC BEARING USING CUTTING TOOL THAT PERFORMS MICRO ALTERNATING DRIVE

(75) Inventors: Hisayuki Aoshima, Shizuoka (JP); Hiroshi Iwai, Shizuoka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 588 days.

(21) Appl. No.: 12/572,900

(22) Filed: Oct. 2, 2009

(65) Prior Publication Data

US 2011/0080673 A1    Apr. 7, 2011

(51) Int. Cl.
*B21D 53/10*    (2006.01)
(52) U.S. Cl. ............ 29/898.13; 29/898; 384/100; 72/81
(58) Field of Classification Search ............ 216/8; 29/898–898.15; 72/80, 81, 95; 407/13; 409/259
See application file for complete search history.

(56) References Cited

U.S. PATENT DOCUMENTS 6,524,451 B1 * 2/2003 Cochran ............ 204/228.3

FOREIGN PATENT DOCUMENTS

| JP | 09057359 A | * | 3/1997 |
| JP | 10-076411 | | 3/1998 |
| JP | 10314853 A | * | 12/1998 |
| JP | 11-019804 | | 1/1999 |
| JP | 2000039023 A | * | 2/2000 |
| JP | 2003214427 A | * | 7/2003 |

* cited by examiner

*Primary Examiner* — David Bryant
*Assistant Examiner* — Jacob Cigna
(74) *Attorney, Agent, or Firm* — Fulwider Patton LLP

(57) ABSTRACT

A method manufacturing of a fluid dynamic bearing includes: forming a substantially linear groove having a length corresponding to a circumferential direction width of the dynamic pressure groove formed on the inner circumferential surface of a shaft housing hole portion, along the circumferential direction of a surface orthogonal to a first processing direction along the central axis direction of a work, by a byte that performs a micro alternating drive in a second processing direction orthogonal to the first processing direction; and extending the dynamic pressure groove that extends in the first processing direction by continuously forming the substantially linear grooves in the first processing direction by displacing the relative positions of the work and the byte in the first processing direction.

19 Claims, 8 Drawing Sheets

METHOD MANUFACTURING OF FLUID DYNAMIC BEARING USING CUTTING TOOL THAT PERFORMS MICRO ALTERNATING DRIVE

FIELD OF THE INVENTION

The present invention relates to a method of manufacturing a fluid dynamic bearing, a fluid dynamic bearing and a disk drive device provided with the fluid dynamic bearing.

DESCRIPTION OF THE RELATED ART

Recently, disk drive devices such as HDDs have been dramatically improved in their rotational accuracy by providing fluid dynamic bearings, and therefore those with high density and large capacity can be available. Due to this, fluid dynamic bearings and disk drive devices provided with the bearings have been mounted in a wide variety of apparatuses. Accordingly, the disk drive devices have been used in various environments, and with this, there have been demands for more inexpensive disk drive devices as well as improved characteristics such as miniaturization, light weight, low current and high stiffness.

With the needs being diversified as stated above, specifications for the disk drive devices have been diversified, thereby the fluid dynamic bearings mounted therein also being requested to have various specifications. Therefore, it is requested that various kinds of the bearings are efficiently manufactured.

For a stable drive of the disk drive device, it is needed that the built-in fluid dynamic bearing exhibits predetermined performance to smoothly rotate a rotating shaft. To realize that, a fluid dynamic bearing suitable for the use of the disk drive device is needed. In a general disk drive device, the rotating shaft is housed in a space encompassed by a sleeve and other members, the housing space being filled with a lubricant. Herringbone-shaped dynamic pressure grooves are provided in a plurality of areas spaced from each other in the axial direction on the inner circumference of the sleeve. By the lubricant flowing into the herringbone-shaped dynamic pressure groove upon the rotating shaft being rotated, the lubricant has an area where a high pressure is generated. With the pressure, the rotating shaft is distanced from the surrounding wall surface, allowing the rotating shaft to be in a state of substantially being rotated in a contactless manner. As a result, stable and high-speed rotation of a recording disk, which is rotated with the rotating shaft, can be realized, allowing stable writing or reading of data to be executed.

The sleeve having such a dynamic pressure groove is often processed with a cutting tool, as disclosed in, for example, Japanese Patent Application Publication No. H1076411 and Japanese Patent Application Publication No. H11-19804. Or, that is often processed with a groove processing tool having a rolled ball, as disclosed in, for example, Japanese Patent Application Publication No. H7-223127 and Japanese Patent Application Publication No. H8-281339. When using the rolled ball, the groove processing tool is entered inside a cylindrical portion of a bearing base material, the sleeve is made of which, so that a plurality of rolled balls embedded in the tip of the groove processing tool are pressed against the inner circumferential surface of the baring base material so as to process the surface, thereby the herringbone-shaped dynamic pressure grooves being sequentially formed. The process using the rolled ball is widely used, because processing accuracy thereof can be determined by the accuracy of the rolled ball and the process is easy to be carried out.

In the ball-rolling process stated above, a dimension of the bottom of the dynamic pressure groove is determined by a distance from the center of the outer circumference tip of the ball in the groove processing tool. Therefore, if the radius of a shaft housing hole portion in the bearing base material is varied, a variation in the radius becomes, as it is, a variation in depth of the dynamic pressure groove. As a result, there is a problem that a dynamic pressure generated by such a dynamic pressure groove is varied, causing a dynamic pressure balance to deviate from a designed value.

Also, there is a problem that the ball-rolling process cannot deal with the case where the depth of the dynamic pressure groove is desired to be adjusted in accordance with a distance from the end of the shaft housing hole portion. Also, there is a problem that the ball-rolling process takes a long time because the process cannot be carried out at a high speed, and the bearing base material is likely to deform because a stress exerted thereon during the process is large, causing dimension accuracy of the sleeve after processed to be likely deteriorated.

In addition, a radius of the ball in the general ball-rolling process is difficult to be made R 0.3 mm or less. Therefore, a fine shape having R 0.3 mm or less cannot be manufactured as a shape of the dynamic pressure groove. Further, the groove processing tool is used only for a certain processed diameter, and hence another groove processing tool must be prepared if the processed diameter is different by even 1 μm. For example, in the bearing for 2.5" hard disk drive devices, the inner diameter of the cylindrical portion is 2.5 mm, and in the bearing for 3.5" hard disk drive devices, that is 4.0 mm. Accordingly, the groove processing tools used only for the respective diameters and the respective equipment for the tools, must be prepared. Therefore, such a groove processing tool is not economical in terms of expenditures and resources, causing a major problem. Also, there is a problem that, when intending to change the inner diameter of the cylindrical portion by even 1 μm due to a certain reason, the groove processing tool must be newly prepared and the equipment for the tool must be remodeled.

SUMMARY OF THE INVENTION

Accordingly, the present invention has been made to solve the aforementioned problems, and a purpose of the invention is to provide a method of manufacturing a fluid dynamic bearing that can meet demands for various dimensions. Further, the purpose of the invention is to provide a fluid dynamic bearing manufactured by using the method and a disk drive device provided with the fluid dynamic bearing.

To solve the aforementioned problems, an embodiment of the present invention is a method of manufacturing a fluid dynamic bearing in which, by supporting a bearing base material having, at its center, a housing hole portion for a rotating shaft and by rotating the bearing base material around the central axis thereof, the inner surface of the housing hole portion is cut with a cutting tool to form a dynamic pressure groove, the manufacturing method comprises: forming a substantially linear groove having a length corresponding to a circumferential direction width of the dynamic pressure groove formed on the inner circumferential surface of the housing hole portion, along the circumferential direction of a surface orthogonal to a first processing direction along the central axis of the bearing base material, by the cutting tool that performs a micro alternating drive in a second processing direction orthogonal to the first processing direction; and extending the dynamic pressure groove that extends in the first processing direction by continuously forming the substantially linear grooves in the first processing direction by displacing the relative positions of the bearing base material and the cutting tool in the first processing direction.

To solve the aforementioned problems, another embodiment of the present invention is a fluid dynamic bearing comprising: a rotating shaft; a shaft housing member that rotatably houses the rotating shaft; a first radial dynamic pressure groove and a second radial dynamic pressure groove that are arranged so as to be spaced apart from each other in the axial direction on the inner circumferential surface of the shaft housing member; a circumferential concave portion that is arranged between the first radial dynamic pressure groove and the second radial dynamic pressure groove; and a lubricant that is filled in a gap between the outer circumferential surface of the rotating shaft and the inner circumferential surface of the shaft housing member, wherein, in each of the first radial dynamic pressure groove and the second radial dynamic pressure groove, substantially linear grooves having a length corresponding to a circumferential direction width of the dynamic pressure groove, the substantially linear grooves being formed along the circumferential direction of a surface orthogonal to the axial direction on the inner circumferential surface of the shaft housing member, are continuously arranged in the axial direction.

By using the fluid dynamic bearing according to the above embodiment, disk drive devices having various specifications can be readily provided.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
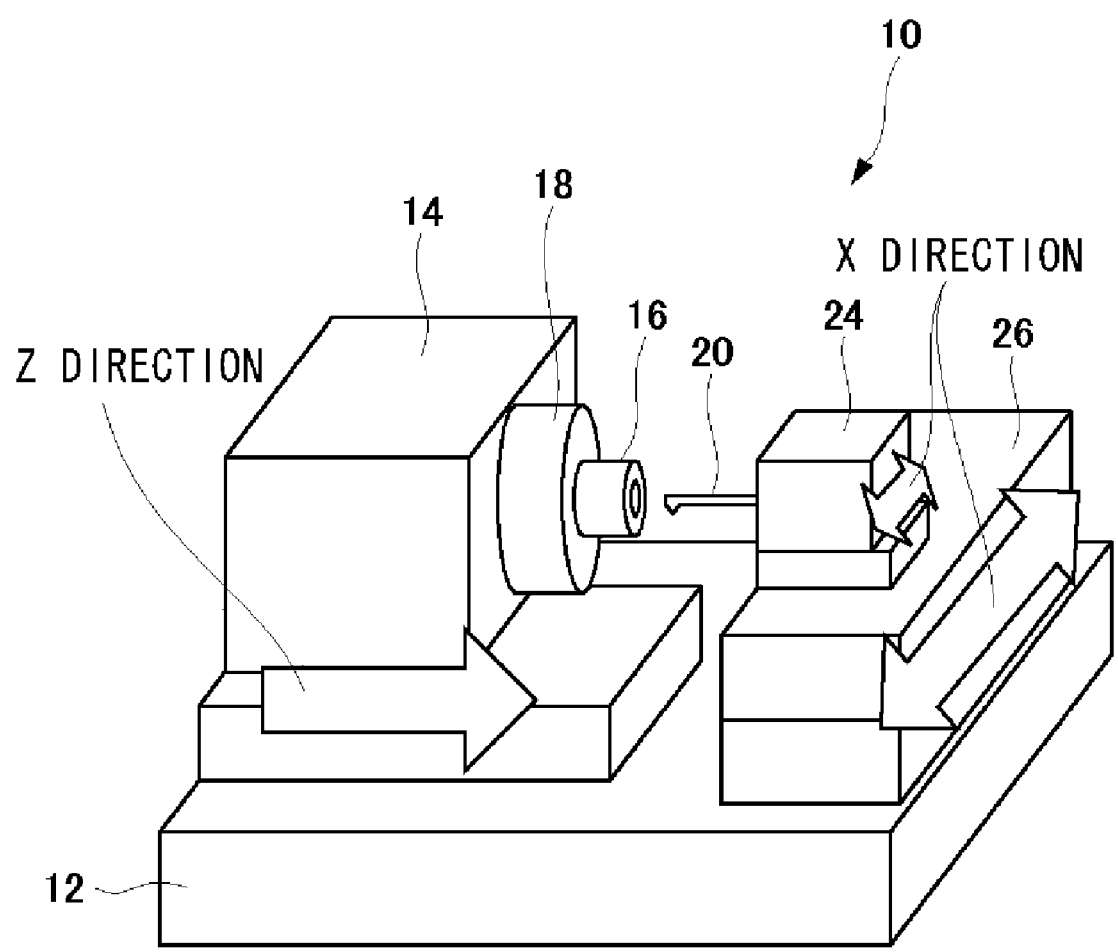
FIG. 1 is a view illustrating manufacturing equipment used in the manufacturing method of a fluid dynamic bearing of the present embodiment.

The invention will now be described by reference to the preferred embodiments. This does not intend to limit the scope of the present invention, but to exemplify the invention. FIG. 1 is a view illustrating the manufacturing equipment 10 used in the manufacturing method of the fluid dynamic bearing according to an embodiment of the present invention. A rotational drive unit 14 is arranged on the base 12. The rotational drive unit 14 holds with a chuck 18 a bearing base material (hereinafter, referred to as a "work 16"), which forms a sleeve functioning as a shaft housing member that houses a rotating shaft of the fluid dynamic bearing, so that the work 16 is rotated. A rotation speed of the rotational drive unit 14 is selected, for example, as approximately 3000 rpm. The speed is selected based on test results that: there is a problem that the speed equal to or lower than 1000 rpm makes a processing time long; and there is also a problem that the speed higher than 5000 rpm makes processing accuracy deteriorated. However, it is preferable that the rotation speed is appropriately changed in accordance with changes in material and size of the work and process conditions, etc.

Figure 2:
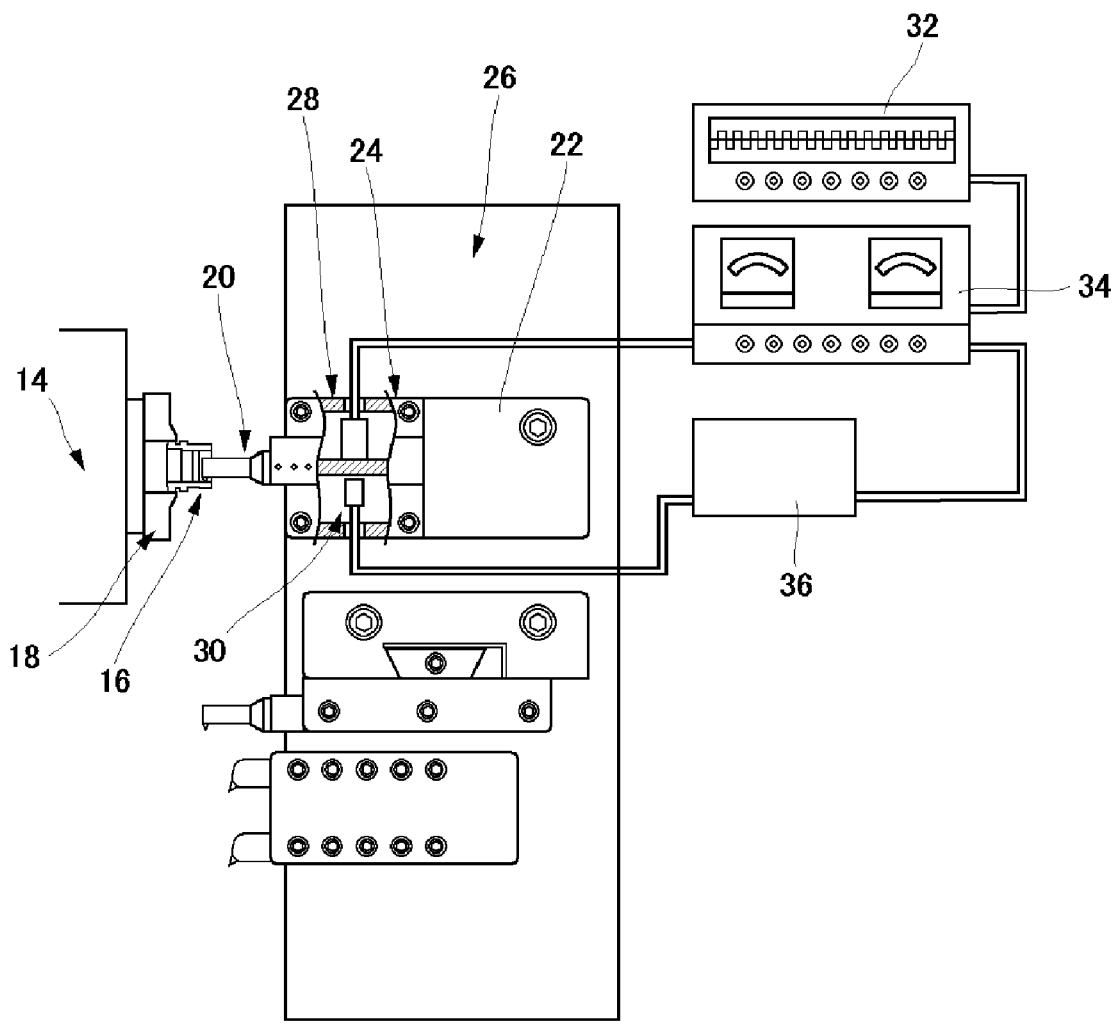
FIG. 2 is a top view mainly illustrating a work and a byte-mounting portion in FIG. 1.

FIG. 2 is a top view mainly illustrating the work 16 and a byte-mounting portion 22 where a byte 20, a cutting tool, is held. The byte-mounting portion 22 is arranged such that the byte 20 is located on the extended line of the rotation center of the work 16. In this case, it is assumed that the rotation center of the work 16 is Z-axis direction (also referred to as a first processing direction) and the direction orthogonal to the Z-axis direction is X-axis direction (also referred to as a second processing direction).

In the manufacturing equipment 10, at least one of the rotational drive unit 14 and the byte-mounting portion 22 is designed to move in the Z-axis direction. Also, a first X-axis drive unit 24 for micro-moving the tip of the byte 20 in the X-axis direction (second processing direction), and a second X-axis drive unit 26 on which the first X-axis drive unit 24 is mounted for moving the first X-axis drive unit 24 in the X-axis direction (second processing direction), are provided. The second X-axis drive unit 26 can have a servomotor, etc., as a drive source.

In the present embodiment, the first X-axis drive unit 24 uses a piezo element 28 as a drive source as illustrated in FIG. 2. Further, the first X-axis drive unit 24 is designed to have the maximum response speed of, for example, 1 KHz, the resolution of 0.1 μm and the amplitude of 10 μm. The first X-axis drive unit 24 is provided with an electrostatic capacitance-type displacement sensor 30 for detecting a drive displacement of the piezo element 28. By performing feedback of an output from the displacement sensor 30, the first X-axis drive unit 24 drives the piezo element 28 accurately and improves the temperature characteristics of the piezo element 28. Thereby, the first X-axis drive unit 24 improves the response performance and displacement accuracy thereof, allowing process with high-accuracy.

In the present embodiment, the manufacturing equipment 10 comprises: a rotational reference position detector (not illustrated) that detects the reference position of the work 16; an encoder (not illustrated) that detects a rotation angle of the work 16; a byte position detector (not illustrated) that detects a position of the byte; and a controller (not illustrated) that controls the period and the phase of the alternating drive of the piezo element 28 in accordance with outputs from the rotational reference position detector, the encoder and the byte position detector. The rotational reference position detector may be configured to detect the rotational reference position of the work 16 in every one rotation by counting an output signal from the encoder.

Figure 3:
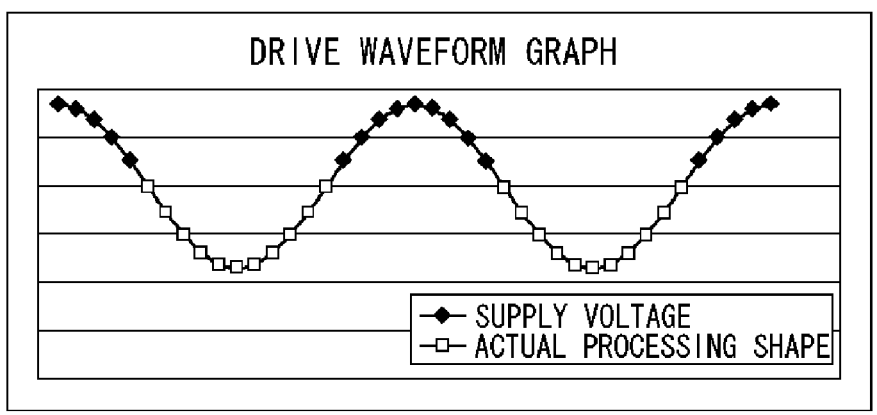
FIG. 3 is a graph illustrating a driving voltage waveform having a sinusoidal shape used for driving a piezo element of the embodiment.

With the driving voltage waveform of the first X-axis drive unit 24, various drive waveforms having a shape such as an approximately rectangular wave shape and an approximate sine wave shape have been studied. The test results shows that a drive waveform having an approximate sine wave shape or an approximately trapezoidal wave shape provides preferred processing accuracy. For example, in the case of the driving voltage waveform having the approximate sine wave shape as illustrated in FIG. 3, the tip of the byte 20 is spaced apart from the surface of the work 16, and thereby cutting is not performed during most half circles of one side, while cutting is performed during half cycles of the other side. Positions of the first X-axis drive unit 24 thus configured are controlled by the second X-axis drive unit 26. As a result, it becomes possible that the whole circumference of the inner surface of the work 16 is not cut, but only the dynamic pressure groove area is cut, allowing the preferred processing accuracy to be provided. Further, the contact state of the byte 20 with the work 16 can be optimized, allowing the wear characteristics of the byte 20 to be improved. It is noted that a pulse oscillator 32 and a piezo element driving source 34 are connected to the manufacturing equipment 10 in order to drive the piezo element 28, and a displacement sensor controller 36 that executes feedback control in order to drive the piezo element 28 in an optimized state, are also connected thereto.

The inner circumferential surface of the shaft housing hole portion in the work 16 of the present embodiment, has a taper, the radius of which is small at its both ends and becomes progressively larger toward its center. The taper is provided for the purpose, etc., that a pressure at the intermediate portion thereof does not become lower than the atmospheric pressure, when the fluid dynamic bearing functions. In the present embodiment, the taper having a diameter that is approximately 0.6 μm larger at its center relative to that at its both ends, is formed.

In the present embodiment as stated above, the second X-axis drive unit 26 is provided separately from the first X-axis drive unit 24. The second X-axis drive unit 26 adjusts a driving position of the byte 20, when the tip of the byte 20 is driven against the inner circumferential surface of the work 16 in accordance with the aforementioned taper shape. As stated above, by manufacturing the fluid dynamic bearing with the second X-axis drive unit 26 being provided separately from the first X-axis drive unit 24, dynamic pressure grooves having a certain depth can be formed irrespective of the presence of the aforementioned taper, allowing a balances of dynamic pressures generated to be stabilized. Also, the depth of the dynamic pressure grove can be readily adjusted in accordance with the distance from the end of the shaft housing hole portion. For example, when two dynamic pressure grooves having a herringbone shape are formed along the Z-axis of the sleeve, a suction pressure on the side near the end of the housing hole of the sleeve becomes relatively higher than that on the center side, with each depth of the respective grooves on the center side being shallower than that on the end side. As a result, a pressure is concentrated in the intermediate portion of the sleeve, allowing a pressure equal to or higher than the atmospheric pressure to be maintained.

Figure 4:
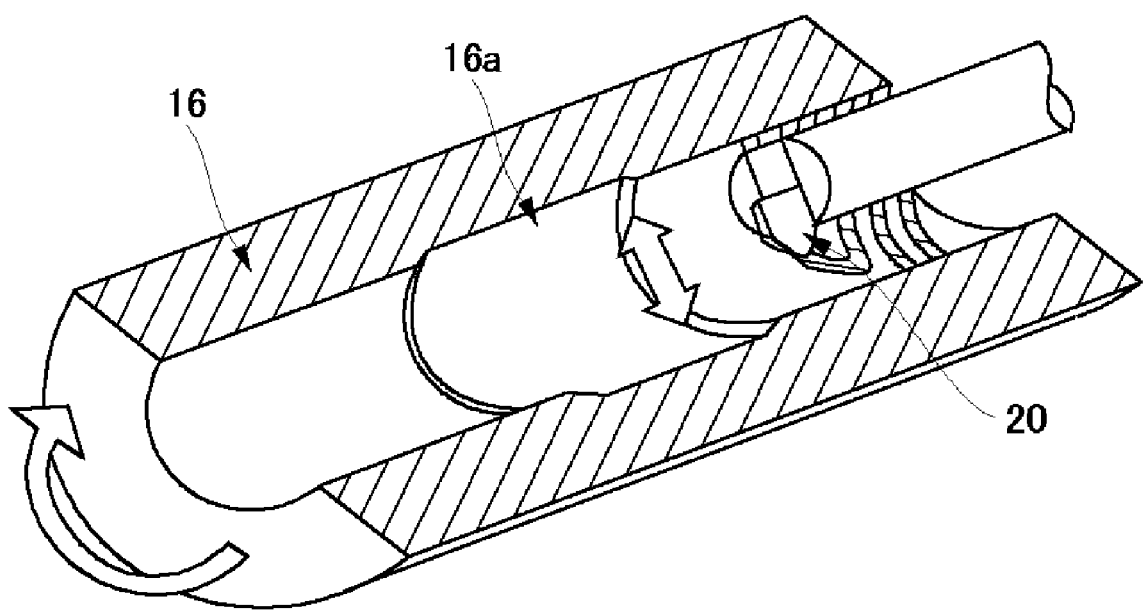
FIG. 4 is a view schematically illustrating the relationship between the work and byte in the manufacturing method of the embodiment.

FIG. 4 is a view schematically illustrating the relationship between the work 16 and the byte 20. The tip of the byte 20 becomes in contact with the inner circumferential surface of the cylinder portion of the work 16 that is being rotated with the alternating control by the piezo element 28, and operates so as to cut the surface thereof with a predetermined cut depth. In the case, because the work 16 is being rotated at a high speed and the byte 20 is vibrating by the micro alternating drive of the piezo element 28, the cutting is preformed in a substantially point shape.

Figure 5A:
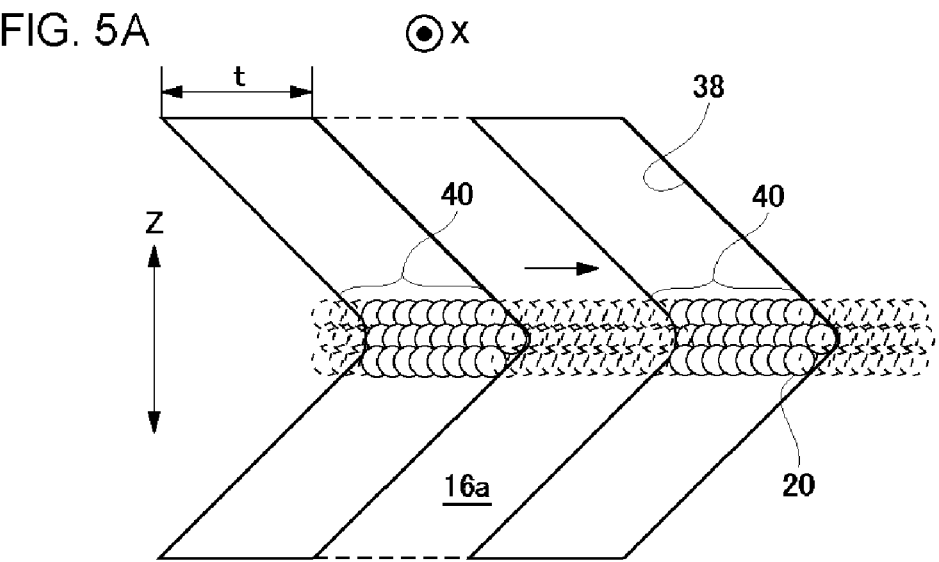
FIG. 5A is a view schematically illustrating a process of forming a herringbone-shaped dynamic pressure groove in the present embodiment, by expanding the groove in a plane.

FIG. 5A is a view schematically illustrating the inner circumferential surface 16a of the work 16, the inner circumferential surface being expanded in a plane, in order to explain a process of forming the herringbone-shaped dynamic pressure groove 38 in the present embodiment. In FIG. 5A, trajectories of the tip of the byte 20 are represented by circles. A substantially linear groove is formed in a state where the tip of the byte 20 is fixed relative to the Z-axis direction (first processing direction) of the work 16. That is, cutting is performed on the same inner circumferential surface in the X-axis direction of the work 16, by rotating the work 16 and by performing a micro alternating drive on the piezo element 28. Thereby, the substantially linear groove 40 having a length corresponding to the circumferential direction width t of the dynamic pressure groove 38, is formed. For example, when forming four dynamic pressure grooves 38 on the inner circumferential surface 16a, point-shaped cutting is performed on four places of the work 16 during one rotation thereof, as stated above. Thereafter, by delicately shifting the rotation period of the work 16 and the alternation period of the piezo element 28 while maintaining the relative positions in the Z-axis direction of the work 16 and the byte 20, the substantially linear groove 40 having the circumferential direction width t is formed in which the point-shaped cutting is continued along the circumferential direction of the surface orthogonal to the axial direction (Z-axis direction) of the work 16. As an alternative method, the substantially linear groove 40 having a length corresponding to the circumferential direction width t may be formed by one contact between the work 16 and the byte 20, with the period of the micro alternating drive of the piezo element 28 being adjusted. Further, the substantially linear groove 40 having a depth corresponding to the depth of the dynamic pressure groove 38 to be formed, may be formed by one contact therebetween. Or, the substantially liner groove 40 having the depth corresponding to the depth of the dynamic pressure groove 38 may be formed by gradually deepening the groove in the X-axis direction at the same position. After the substantially linear groove 40 is formed on the same inner circumferential surface of the surface orthogonal to the Z-axis direction of the work 16, the dynamic pressure groove 38 is then formed by forming the substantially linear grooves 40 on the inner circumferential surface 16a of the cylindrical portion such that the substantially linear grooves 40 are continuously arrayed in the Z-axis direction, with the relative positions in the Z-axis direction (first processing direction) of the work 16 and the byte 20 being changed.

In FIG. 5A, areas illustrated by the circular continuous lines on the inner wall of the work 16 are cut by driving the byte 20 in the X-axis direction, i.e., outwards in the radial direction of the work 16; while those illustrated by the circular dashed lines are not cut by driving the byte 20 inwards in the radial direction thereof. In the cutting method according to the present embodiment, cycle operations of cutting and non-cutting are alternately performed on the inner circumferential surface along the rotational direction of the work 16. The cycle operation of cutting and non-cutting are driven by the first X-axis drive unit 24. The process is referred to as forming a substantially linear groove. The forming a substantially linear groove can be realized by an electromagnetic drive principle such as a voice coil, etc., or a mechanical drive principle such as a cam and oil pressure, instead of the piezo element 28, but is not limited thereto. In the present embodiment, a dynamic pressure groove with high accuracy can be formed by controlling the period and the phase of the alternating drive such that they are synchronized with a rotational position of the work 16 and a position of the byte 20, etc., without simply performing the alternating drive.

Figure 5B:
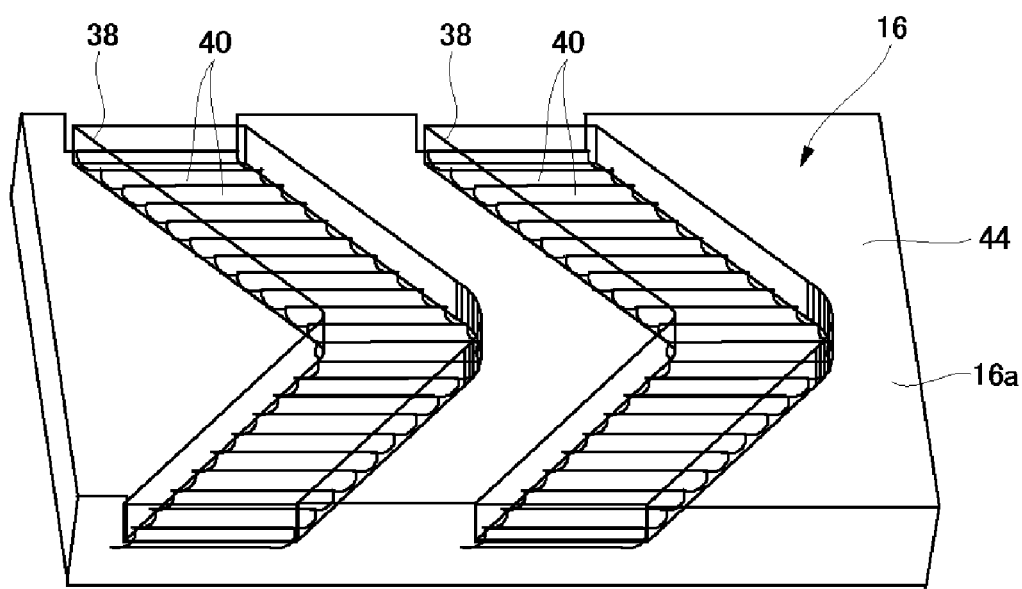
FIG. 5B is a view illustrating a state where the dynamic pressure groove is structured by continuously forming substantially linear grooves.

FIG. 5B is a perspective view illustrating a state where the dynamic pressure groove 38 is formed: by forming the substantially linear groove 40 along the circumferential direction of the surface orthogonal to the axial direction by using the forming a substantially linear groove where the cycle operations of cutting by the byte 20 and non-cutting are alternately performed; and by continuously forming the substantially linear grooves 40 in the Z-axis direction (first processing direction). This process is referred to as extending the dynamic pressure groove that extends in the first processing direction by continuously forming the substantially linear grooves 40.

The aforementioned manufacturing method of a fluid dynamic bearing has various advantages in comparison with the manufacturing method of a fluid dynamic bearing by the conventional ball-rolling process. Hereinafter, the manufacturing method thereof according to the present embodiment will be described, comparing with the conventional method.

Figure 6:
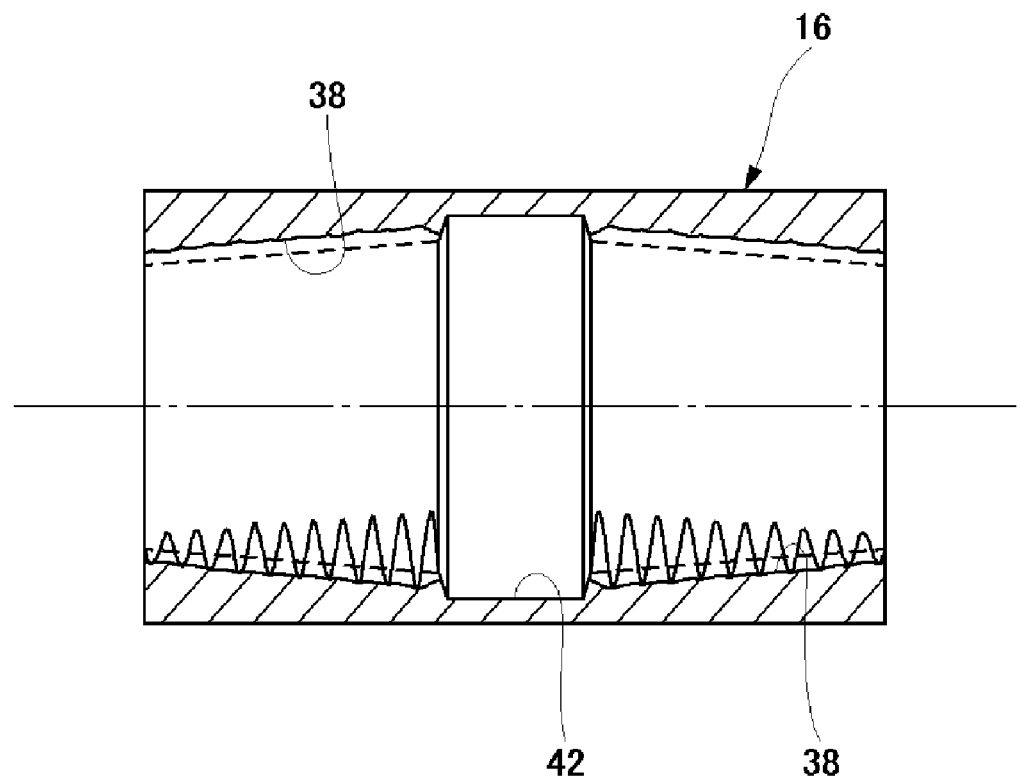
FIG. 6 is a view illustrating that a taper-shaped shaft housing hole portion is being processed while changing an amplitude of the alternating drive of the piezo element so as to correspond to the taper shape.

As stated above, the inner diameter of the work 16 is preferably processed so as to be tapered such that, when formed into the fluid dynamic bearing, a pressure at the intermediate thereof is not lower than the atmospheric pressure. Accordingly, in the present embodiment, the work 16 is at first processed as indicated by the dashed lines, as illustrated in FIG. 6. That is, the work 16 is processed so as to be tapered in which the diameter on the center side is larger than that on the end side. Therefrom, the dynamic pressure groove 38 is cut with the byte 20. At the time, the first X-axis drive unit 24 makes an amplitude of the piezo element 28 small at the end of the work 16 and makes it gradually larger toward the center side. Trajectories of the tip of the byte 20 becomes the same as illustrated by the continuous lines in FIG. 6, by making a difference between both amplitudes equal to that between the minimum diameter and the maximum diameter of the taper. That is, for slight movement in the X direction such as a degree of a taper angle, the depth of the dynamic pressure groove 38 can be made uniform at any position of the work 16 by adjusting the amplitude of the piezo element 28, without moving the second X-axis drive unit 26 while processing the dynamic pressure groove. By controlling the first X-axis drive unit 24 in this way, the dynamic pressure groove 38 can be processed into a fine and arbitrary shape. Further, the depth of the dynamic pressure groove 38 can be readily changed at an arbitrary position, allowing fine adjustment of the dynamic pressure performance.

In processing the dynamic pressure groove by the conventional ball-rolling process, the radius of the ball cannot be smaller than the width of the dynamic pressure groove, i.e., practically cannot be equal to or smaller than 0.3 mm, because a large processing resistance is generated due to the ball-rolling, and because the dynamic pressure groove is extended in the groove direction. Therefore, the dynamic pressure groove cannot be processed into a fine shape equal to or smaller than R 0.3 mm. In the present embodiment, the substantially linear grooves 40 are formed in the width direction of the dynamic pressure groove 38 and they are continued together as illustrated in FIGS. 5A and 5B, allowing the radius of the tip of the byte 20 to be small irrespective of the width of the dynamic pressure groove 38. If the radius of the tip of the byte 20 is, for example, equal to or smaller than R 0.1 mm, the dynamic pressure groove 38 can be freely manufactured with a fine shape equal to or smaller than R 0.1 mm. Further, when the radius of the tip of the byte 20 is made small, the cutting resistance can be reduced, allowing even the work 16 having a thin thickness to be readily processed, without causing any shape deformation. As it has been learned from test results that, if the radius of the tip of the byte 20 is smaller than R 0.02 mm, the durability of the byte 20 is deteriorated, the radius R of the tip of the byte 20 is preferably selected between 0.02 mm and 0.1 mm.

A groove processing tool using the conventional ball-rolling is used only for a certain diameter of the inner circumferential surface of the work 16, and hence anther groove processing tool must be prepared if the diameter of the inner circumferential surface is different by even 1 μm. For example, in a bearing for 2.5" HDD, the diameter of the cylindrical portion is 2.5 mm, and in a bearing for 3.5" HDD disk drive devices, that is 4.0 mm. As a result, a groove processing tool cannot be used in common, and therefore individual equipment and groove processing tools must be prepared. That is, such groove processing tools are inefficient in terms of expenditures and resources, causing a major problem. Also, when intending to change the inner diameter of the cylindrical portion by even a small amount due to a certain reason, there occurs a need that the groove processing tool must be newly prepared and the equipment for the tool must be remodeled. On the other hand, in the present embodiment, the second X-axis drive unit 26, the first X-axis drive unit 24 is mounted on which and which is driven in the X-axis direction, is designed to be driven over a distance of 1 mm. Accordingly, even for the work 16 having a difference between diameters of the inner circumferential surface of 2 mm or more, the same processing tool and equipment can be used. Because a difference between the diameters of the inner circumferential surfaces of the bearings for 2.5" HDD and 3.5" HDD is 1.5 mm, the same processing tool and equipment can be used, even taking into consideration errors in their parts, etc. Accordingly, there is no need to prepare a plurality kinds of equipment and groove processing tools. Further, even when changing the inner diameter of the cylindrical portion due to design modification, it can be readily dealt with by controlling the second X-axis drive unit 26, leading to an advantage that the manufacturing method of the present embodiment can readily deal with various dimensions.

In the fluid dynamic bearing manufactured by such a manufacturing method of a fluid dynamic bearing, the shape of the dynamic pressure groove 38 can be readily changed so as to match required dynamic pressure performance, without changing the shape of the byte 20 and the equipment. Therefore, the processing accuracy of the dynamic pressure groove can be improved in comparison with that of the dynamic pressure groove formed by the conventional ball-rolling, thereby allowing a fluid dynamic bearing having a less variation in its characteristics as a bearing to be provided. Further, because the dynamic pressure groove is made by forming a plurality of substantially linear grooves with the cut processing, there occurs less processing stress, not causing any deformation of the inner circumference in even a work having a thin thickness. Accordingly, a fluid dynamic bearing small in size and light in weight can be provided. Further, because the cut processing can be performed while rotating a work at a high speed, the processing time can be shortened to approximately 60% of that in the conventional ball-rolling process. As a result, production efficiency can be improved, allowing an inexpensive fluid dynamic bearing to be provided.

Figure 7:
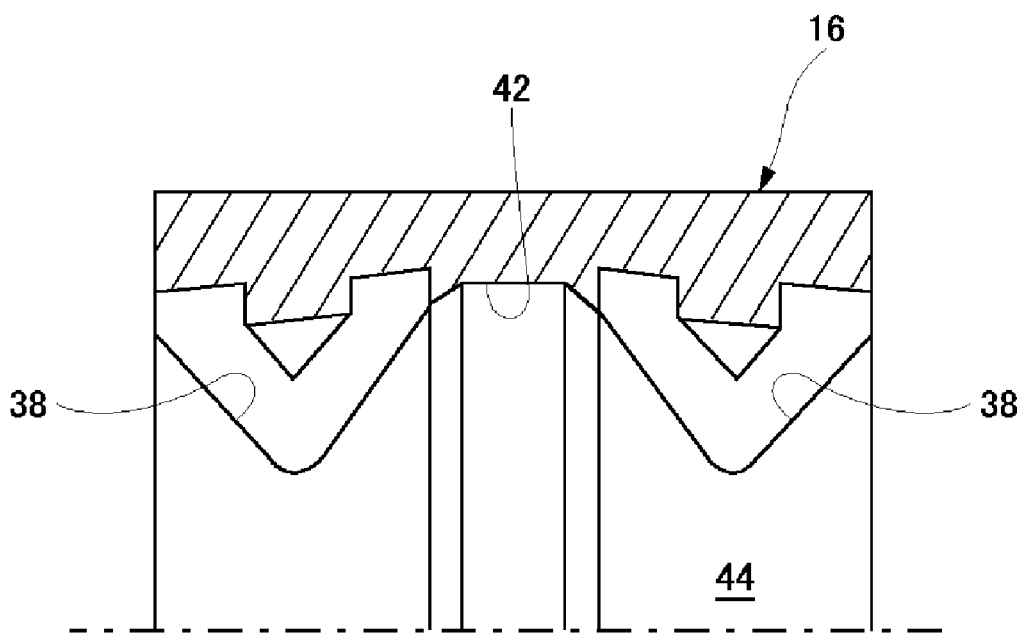
FIG. 7 is a view illustrating that two sets of herringbone-shaped dynamic pressure grooves are formed in the axial direction in the shaft housing hole portion, with the dynamic pressure grooves sandwiching the intermediate portion.

In the conventional fluid dynamic bearing, two sets of the herringbone-shaped dynamic pressure grooves 38 are formed in the axial direction, with the dynamic pressure grooves sandwiching the intermediate portion 42, as illustrated in FIG. 7. And, it is designed that a discharge pressure and a suction pressure of the lubricant is equivalent to each other at a fluid dynamic pressure generating site by the dynamic pressure groove 38. A pressure at the intermediate portion 42 formed between these fluid dynamic pressure generating sites is designed to be slightly higher than the atmospheric pressure. However, in the fluid dynamic bearing formed by the conventional ball-rolling process, the balance between the discharge pressure and the suction pressure is likely to collapse due to variations in the dimensions of the inner circumference of the work or in the dynamic pressure groove process, causing a variation in pressure at the intermediate portion. If the pressure at the intermediate portion is lower than the atmospheric pressure due to such variations, air dissolved in the lubricant is vaporized due to reduced pressure and lies between the inner circumferential surface and the rotating shaft, becoming a cause of producing a variation in the bearing performance.

On the other hand, in the present embodiment, the bearing base material to become the shaft housing portion is formed of, for example, a copper material, and two herringbone-shaped dynamic pressure grooves 38 having a depth of approximately 5 μm are formed in the inner wall of the cylindrical portion of the bearing base material having an inner diameter of 2 to 4 mm, by using the aforementioned method of manufacturing a fluid dynamic bearing. FIG. 7 illustrates part of the cross-section of the work 16 in which the shaft housing hole portion 44 has a taper formed on the inner circumferential surface thereof, the taper having a diameter expanding by approximately 0.6 μm from the respective both ends toward the intermediate portion 42. By providing the taper, a gap with the rotating shaft becomes larger on the center side than that on the side near to the end of the shaft housing hole portion 44, with respect to each of the two dynamic pressure grooves 38 sandwiching the intermediate portion 42. In this case, regarding a dynamic pressure, a suction pressure on the side near to the end where the gap with the shaft is small, becomes relatively high in comparison with that on the center side, thereby the pressure is concentrated in the intermediate portion 42. As a result, the problem that a pressure at the intermediate portion 42 is lower than the atmospheric pressure, can be avoided. Further, it has been learned from test results that: if a difference between the diameters by the taper is smaller than 0.2 μm, the aforementioned pressure concentration effect cannot be sufficiently expected; and in contrast, if that is larger than 2.0 μm, a problem may possibly occur in the bearing performance. Accordingly, a difference between the diameters by the taper is preferably selected between 0.2 μm and 2.0 μm.

In the conventional fluid dynamic bearing, when the inner diameter of the cylindrical portion is 2 to 4 mm, there is a need that the area forming the dynamic pressure groove in the cylindrical portion is desired to be thin in thickness for light weight and miniaturization of the bearing. Therefore, it has been tried that the ball-rolling process is performed with a thickness of the area being equal to or less than 1.0 mm. However, because the ball-rolling process entails a large processing resistance, the cylindrical portion is likely to deform. Therefore, the depth of the dynamic pressure groove is to be shallow, not exceeding 3 μm. Also, the ball-rolling process entails a large variation in the depth of the dynamic pressure grooves. When the depth thereof is shallow, a variation in the dynamic pressures due to the variation in the depth prominently appears. As stated above, in the fluid dynamic bearing formed by the ball-rolling process, decrease in the bearing stiffness or non-uniformity in the rotation accuracy is likely to occur, causing the performance of an apparatus mounting the fluid dynamic bearing to be deteriorated.

On the other hand, in the present embodiment, the bearing base material to become the shaft housing portion 44 is formed of, for example, a copper material. In this case, the bearing base material formed of a rod-shaped metal may be subjected to the cutting process. Alternatively, a sintered metal material formed of various metals by using powder metallurgy may be used as the bearing base material. The shaft housing portion 44 formed of a sintered metal material is preferable in terms of being light in weight and being easy to be processed. Even if a fluid dynamic bearing is formed with the inner diameter of the cylindrical portion thereof being 2 to 4 mm and a thickness of the cylindrical portion in an area where the dynamic pressure groove 38 is formed being approximately 0.6 mm, a dynamic pressure groove having a depth of approximately 5 μm can be formed by the byte-cutting entailing a low cutting resistance, with the use of the aforementioned manufacturing method of a fluid dynamic bearing. As a result, the required bearing stiffness can be secured while reducing an influence due to the variation in the depth of the dynamic pressure groove, on a generated dynamic pressure. Accordingly, decrease in the performance of an apparatus mounting the fluid dynamic bearing can be suppressed. It is preferable that a thickness of the cylindrical portion in an area where the dynamic pressure groove is formed is thin; however, if the thickness is less than 0.2 mm, a possibility that deformation may occur due to handling during assembly, becomes high. Therefore, the thickness is preferably 0.2 to 0.6 mm. If the dynamic pressure groove 38 having a depth exceeding 8 μm is intended to be manufactured in the same process conditions as in the present embodiment, a rotation speed during the process is required to be low, causing the processing time to be increased. Also, an amount of the lubricant flowing into the dynamic pressure groove is increased when functioning as a fluid dynamic bearing, causing an increase in the flow load. As a result, that may cause an increase in the current for rotating the rotating shaft, and hence the depth of the dynamic pressure groove 38 is preferably 3 μm to 8 μm.

Figure 8A:
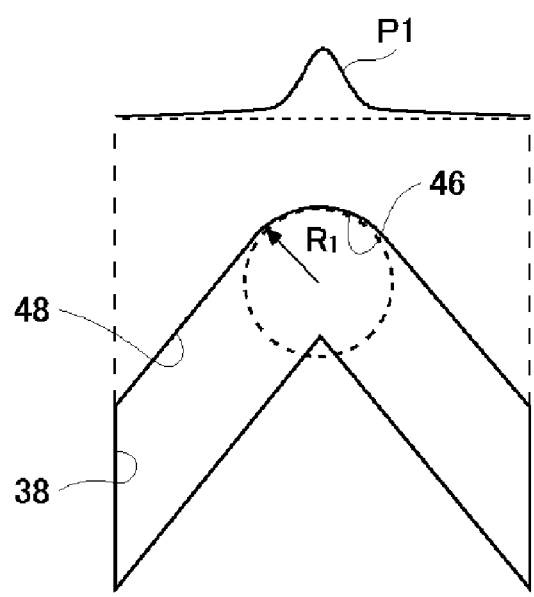
FIG. 8A is a schematic view illustrating the dynamic pressure groove formed by the ball-rolling process, and the case where the radius of a folded portion is large.

The herringbone-shaped dynamic pressure groove 38 as stated above has approximately V-shaped. The dynamic pressure groove 38 generates a dynamic pressure by raking up the lubricant along the edge of the straight section of the V-shape such that the lubricant is concentrated into the folded portion thereof. The radius of the folded portion of the dynamic pressure groove formed by the conventional ball-rolling process is approximately R 0.3 mm. FIG. 8A is a schematic view illustrating the dynamic pressure groove 38 formed by the ball-rolling process, and the case where the radius R1 of the folded portion 46 is large. In this case, the straight section 48 becomes short, and hence efficiency of raking up the lubricant is deteriorated and relief of the pressure becomes large. As a result, there is a problem that a generated dynamic pressure P1 becomes low and resistance in the rotational direction becomes large.

Figure 8B:
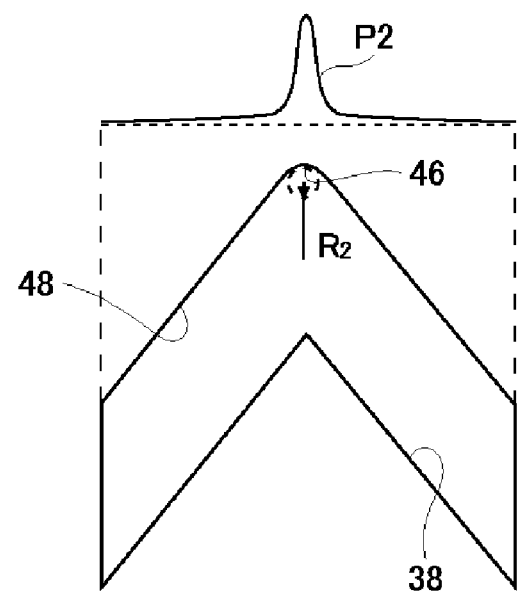
FIG. 8B is a view illustrating the dynamic pressure groove formed by the manufacturing method of the embodiment, and the case where the radius of the folded portion is small.

On the other hand, in the present embodiment, the bearing base material to become the shaft housing portion is formed of, for example, a copper material. And, the dynamic pressure groove 38 having a depth of approximately 5 μm is formed in the inner wall of the cylindrical portion of the bearing base material having an inner diameter of 2 to 4 mm, by the cutting process using a cutting byte having a radius of the tip thereof of 0.05 mm, with the use of the aforementioned method of manufacturing a fluid dynamic bearing. As a result, the radius R2 of the folded portion 46 of the herringbone-shaped dynamic pressure groove 38 can be reduced to 0.05 mm as illustrated in FIG. 8B. Accordingly, the straight section 48 becomes long and the efficiency of raking up the lubricant can be increased. Therefore, the relief of the pressure at the folded portion 46 can be reduced, allowing a generated dynamic pressure P2 to be increased. Namely, the rotating load is reduced and a current necessary for driving the rotating shaft can be reduced. Further, the bearing unit can be relatively small in size, contributing to miniaturization of an apparatus provided with the fluid dynamic bearing and to reduction in the current necessary for driving the apparatus. The radius R of the folded portion 46 is preferably small, however, if R is smaller than 0.02 mm, there is a problem that the wear of the byte used for the cutting becomes large such that the lifetime of the byte becomes short, and the processing time becomes long because the cutting pitch is small. In contrast, if the radius R of the folded portion 46 is larger than 0.1 mm, it has been learned from test results that the aforementioned effects cannot be expected. Accordingly, the radius R of curvature of the folded portion 46 is preferably 0.02 to 0.1 mm.

Figure 9A:
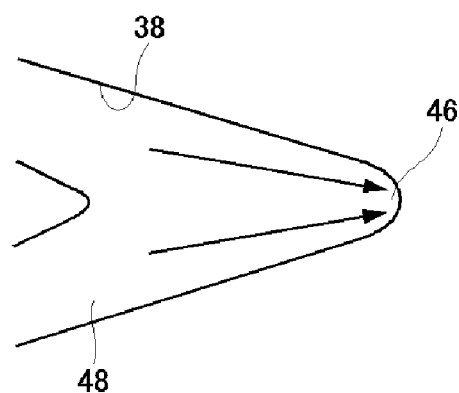
FIG. 9A is an enlarged view of the folded portion of the dynamic pressure groove.
Figure 9B:
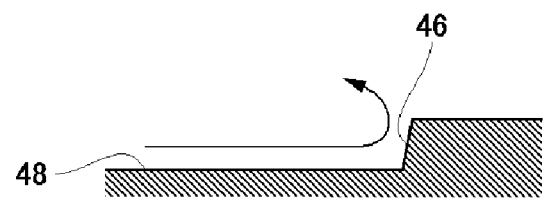
FIG. 9B is an enlarged cross-sectional view illustrating the folded portion of the dynamic pressure groove when the groove depth is fixed.

In the herringbone-shaped dynamic pressure groove 38, when the depth of the dynamic pressure groove at the corner section of the folded portion 46 is large, there is often the case where the wall surface inside the corner section becomes a barrier for the flow of the lubricant such that efficient generation of the dynamic pressure in the radial direction of the shaft housing hole portion 44 is prevented. When the dynamic pressure is not efficiently generated, a rotating load for rotating the rotating shaft becomes large, causing an increase in the current for rotating the shaft. FIG. 9A is an enlarged view of the folded portion 46 of the dynamic pressure groove 38, and the arrows indicate the flow of the lubricant. FIG. 9B is an enlarged view of the folded portion 46 of the dynamic pressure groove 38 when the depth of the dynamic pressure groove at the corner section of the folded portion 46 is the same as that in the straight section 48. In the case of such a shape, the dynamic pressure groove 38 is easily processed, however, a ratio at which the lubricant flowing into the dynamic pressure groove 38 rebounds from the wall surface inside the corner section of the folded portion 46, becomes high, as indicated by the arrows. Accordingly, there is a case where components of pressure in the direction not contributing to the dynamic pressure that supports the rotating shaft in the radial direction, are increased.

Figure 9C:
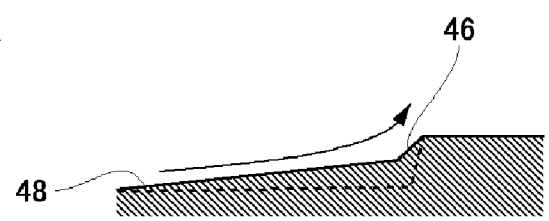
FIG. 9C is an enlarged view illustrating the folded portion of the dynamic pressure groove formed by the manufacturing method of the embodiment.

On the other hand, in the present embodiment, the baring base material to become the shaft housing portion is formed of, for example, a copper material. And, the dynamic pressure groove 38 is formed in the inner wall of the cylindrical portion of the base material having an inner diameter of 2 to 4 mm, by the byte-cutting entailing a low cutting resistance, with the use of the aforementioned manufacturing method of a fluid dynamic bearing. In the case, cut depth by the byte 20 is controlled by adjusting the amplitude of the piezo element 28 in the first X-axis drive unit 24, so that the depth of the dynamic pressure groove at the corner section of the folded portion 46 is made approximately 2 μm. On the other hand, the depth of the dynamic pressure groove in the other straight section 48 is made approximately 5 μm, and the folded portion 46 and the straight section 48 are designed to be connected with each other by a taper, as illustrated in FIG. 9C. By forming, in this way, the depth of the dynamic pressure groove at the corner section of the folded portion 46 so as to be shallower than that in another area, the ratio of the lubricant rebounding from the wall surface inside the corner section of the folded portion 46, is reduced. As a result, components of pressure in the direction contributing to the dynamic pressure that supports the rotating shaft in the radial direction, are increased. As stated above, by making the depth of the dynamic pressure groove 38 shallow in partial areas, the rotation accuracy can be improved with a sufficient dynamic pressure being generated, and the bearing stiffness can be enhanced. Further, because the rotating load can be reduced, allowing the current necessary for driving the rotating shaft to be reduced. As stated above, the aforementioned effects can be acquired by making the depth of the dynamic pressure groove at the corner section of the folded portion 46 shallower than that in another area. Setting of the depth thereof is not limited to the aforementioned values. In the case where the cutting process is performed on the dynamic pressure groove 38 by the byte 20, as in the present embodiment, it is possible that processing efficiency is made in preference by making the depth of the dynamic pressure groove 38 constant as illustrated in FIG. 9B, or improvement in the performance of the dynamic pressure groove 38 is made in preference by providing a slope in the dynamic pressure groove 38 as illustrated in FIG. 9C.

Figure 10:
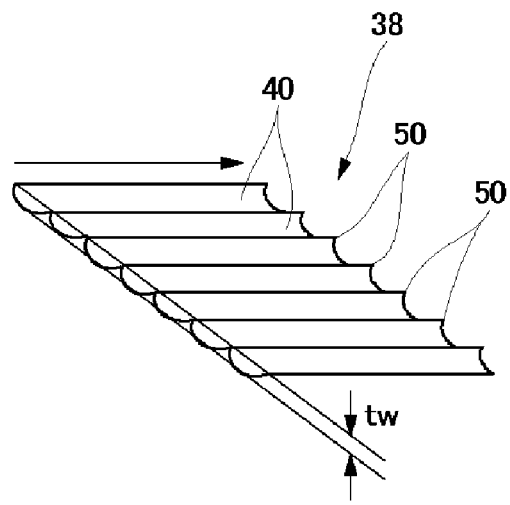
FIG. 10 is a view illustrating a projection wing formed on the dynamic pressure groove.

The bottom surface of the dynamic pressure groove 38 formed by the conventional ball-rolling is smooth. As a result, a contact angle with the lubricant on the bottom surface is small, causing a resistance by the viscosity of the lubricant to be large. That is, the rotation load is increased, causing the current for rotating the rotating shaft to be increased. On the other hand, in the present embodiment, the bearing base material to become the shaft housing portion is formed of, for example, a copper material. And, the herringbone-shaped dynamic pressure groove 38 having a depth of approximately 5 mm is formed in the inner wall of the cylindrical portion of the bearing base material having an inner diameter of 2 to 4 mm, by using the aforementioned method of manufacturing a fluid dynamic bearing. Further, in the present embodiment as illustrated in FIGS. 5B and 10, a projection wing 50 having a height of, for example, 1 μm, the projection wing 50 being long in the rotational direction, is provided on the bottom surface of the dynamic pressure groove 38. The projection wing 50 is one directed to the rotational direction of the rotating shaft, therefore not causing a resistance against the rotational direction. On the other hand, a contact angle with the lubricant flowing along the shape of the dynamic pressure groove 38 becomes large because of the presence of the projection wing 50, allowing the substantial viscosity of the lubricant on the bottom surface of the dynamic pressure groove 38 to be reduced. As a result, the rotating load can be reduced, allowing the current to be reduced. The projection wing 50 may be dedicatedly cut, however, may be substituted with a cut trace formed during the process where the substantially linear grooves 40 are continuously formed in the Z-axis direction by adjusting the radius of the tip of the byte 20 and a feed pitch. Further as stated above, the substantially linear groove 40 can be formed by adjusting an amplitude of the alternating drive of the piezo element 28, even if the inner circumferential surface of the work 16 is taper-shaped as illustrated in FIG. 6. Thereafter, the projection wing 50 can be formed during the process where the substantially linear grooves 40 are continuously formed in the Z-axis direction, allowing the projection wing 50 to be readily formed even in the work 16 having a taper-shaped inner circumferential surface. As a result, a fluid dynamic bearing with a less rotational resistance and high performance can be readily manufactured.

Figure 11:
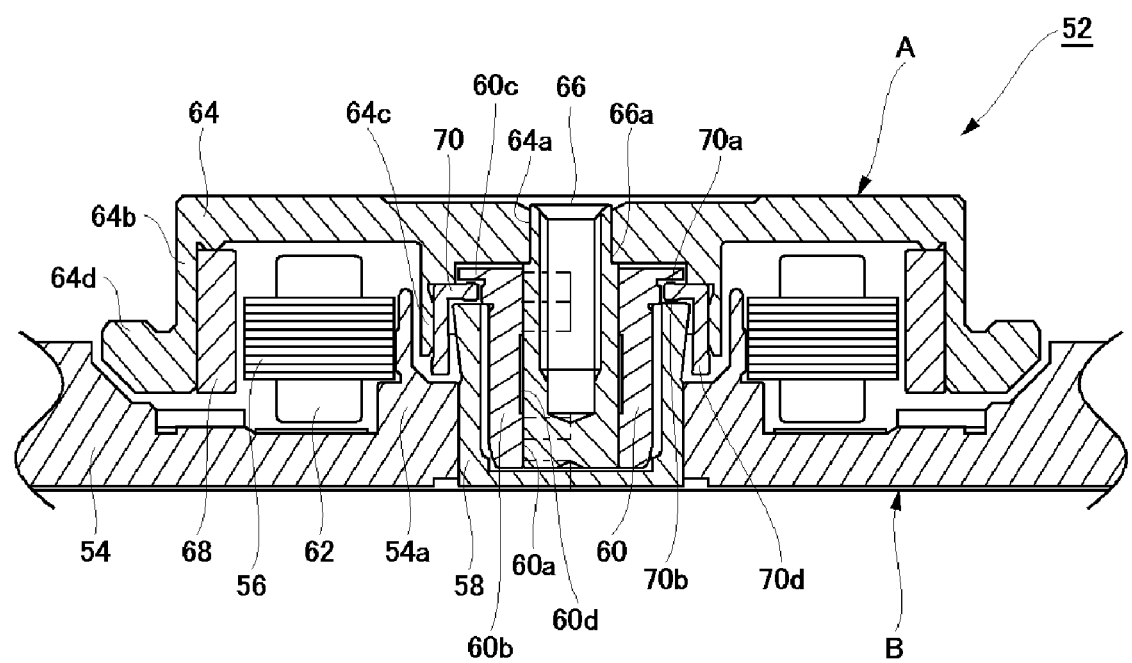
FIG. 11 is an essential part cross-sectional view of the disk drive device that drives a hard disk, to which the fluid dynamic bearing of the embodiment is applied.

FIG. 11 is an essential part cross-sectional view of the disk drive device 52 that drives a hard disk, to which the fluid dynamic bearing of the present embodiment is applied. In FIG. 11, it is assumed for convenience that the side indicated by arrow A is
the upper side (upward) and that indicated by arrow B is the lower side (downward). The disk drive device 52 is configured to include a fixed body, a radial fluid dynamic bearing, a thrust fluid dynamic bearing and a rotating body. A rotating speed of the rotating body is, for example, 5400 rpm.

The fixed body is configured to include a base member 54, a stator core 56 fixed to the outer circumferential surface of the cylindrical portion 54a provided in the base member 54, a circular housing member 58 fixed to the inner circumferential surface of the cylindrical portion 54a and a circular shaft housing member 60 having the inner circumference 60a of the cylindrical portion fixed to the inner circumferential surface of the housing member 58.

A plurality of salient poles extending outwards of the stator core 56 are wounded with coils 62. The shaft housing member 60 has a shape in which a cylindrical portion 60b that houses the rotating shaft 66, and a flange portion 60c that is extended outwards at one end side of the cylindrical portion 60b, are connected together. The housing member 58 is a cup-shaped part having: a cylindrical portion, to the inner circumference of which the shaft housing member 60 is fitted; a bottom portion that seals one end of the cylindrical portion; and an upper-end surface portion that is provided at the other end and has a surface in the axial direction.

The rotating body is configured to include a cup-shaped hub 64, a rotating shaft 66 fixed to a central hole 64a of the hub 64, a ring-shaped magnet 68 and a thrust member 70. The hub 64 is configured to include a first cylindrical portion 64c that is concentric with the central hole 64a and has a small radius, a second cylindrical portion 64b provided outwards and a hub outward extension portion 64d that extends outwards at the end of the second cylindrical portion 64b. The thrust member 70 is fixed to the inner circumferential surface of the first cylindrical portion 64c, and the ring-shaped magnet 68 is fixed to the inner circumferential surface of the second cylindrical portion 64b.

A shoulder portion 66a is provided on the side where the hub 64 of the rotating shaft 66 is connected, and the rotating shaft 66 is press-fitted into the central hole 64a of the hub 64, thereby the both being integrated. The thrust member 70 has a shape in which a disk portion that has a thrust upper surface 70a and a thrust lower surface 70b and is thin in the axial direction, and a descender portion 70d that is long in the axial direction, are combined together on the lower surface on the outer circumferential side of the disk portion. The inner circumferential surface of the descender portion 70d has a tapered-shape in which the radius thereof is gradually becomes smaller toward the tip thereof. In cooperation with the outer circumferential surface of the housing member 58, the inner circumferential surface of the descender portion 70d structures a capillary seal portion that prevents the lubricant filled in a gap of the fluid dynamic bearing, from leaking outside by capillarity.

The disk portion of the thrust member 70 is arranged between the lower surface of the flange portion 60c of the shaft housing member 60 and the upper end surface of the housing member 58 so as to create a narrow gap with each of the surfaces. The outer circumference of the descender portion 70d is fixed to the inner circumference of the first cylindrical portion 64c of the hub 64. The thrust fluid dynamic bearing is structured by providing thrust dynamic pressure grooves on both surfaces of the thrust upper surface 70a and the thrust lower surface 70b.

The radial fluid dynamic bearing is structured with the rotating shaft 66 and the shaft housing member 60 that houses the rotating shaft 66 and supports it rotatably. The shaft housing member 60 has: a first radial dynamic pressure groove and a second radial dynamic pressure groove (not illustrated) that are arranged so as to be spaced apart from each other in the axial direction on the inner circumferential surface thereof, and that are herringbone-shaped; and a circumferential concave portion 60d that is arranged in the intermediate portion between the first radial dynamic pressure groove and the second radial dynamic pressure groove. The lubricant is filled in a gap between the outer circumferential surface of the rotating shaft 66 and the inner circumferential surface of the shaft housing member 60.

In the present embodiment, the shaft housing member 60 is formed of a copper material. And, in the aforementioned method of manufacturing a fluid dynamic bearing, the shaft housing member 60 is designed to have an inner diameter of 2.5 mm and a thickness of the area where the dynamic pressure groove 38 is formed, of approximately 0.6 mm. And, the dynamic pressure groove 38 having a depth of approximately 5 μm is formed by the cutting process using a cutting byte having a radius R of the tip thereof of approximately 0.05 mm. And the radius R of the folded portion 46 of the herringbone-shaped dynamic pressure groove 38 is made 0.05 mm. The rotating body is rotatably supported by the radial fluid dynamic bearing and the thrust fluid dynamic bearing, and is rotationally driven by an electromagnetic action between the stator core 56 and the magnet 68. A magnetic disk (not illustrated) is mounted on the outer circumference of the hub 64, and recording or reading of data is executed by a reading/writing unit (not illustrated).

By mounting the fluid dynamic bearing of the present embodiment in the disk drive device 52 thus structured, a disk drive device 52 with high-accuracy that can be small in size, light in weight and driven with a reduced current, can be efficiently manufactured with a low-cost. In the present embodiment, the way in which a groove is processed inside the shaft housing member 60, the radial fluid dynamic bearing is composed of which, has been described. In another embodiment, the processing method according to the present embodiment may be applied to the case where a dynamic pressure groove is formed on the rotating shaft 66 side. Further, the processing method thereof may be applied to the case where a dynamic pressure groove is formed in a member composing the thrust fluid dynamic bearing. In any one of the cases, a dynamic pressure groove with high accuracy and that can contribute to miniaturization and light weight of a device can be efficiently manufactured. Furthermore, a disk drive device with high performance can be manufactured by using the rotating shaft and the thrust fluid dynamic bearing thus formed.

According to the present embodiment as stated above, a substantially linear groove having a length corresponding to a circumferential direction width of the dynamic pressure groove formed on the inner circumferential surface of the housing hole portion, along the circumferential direction of the surface orthogonal to the first processing direction, by using a cutting tool that performs a micro alternating drive in a second processing direction orthogonal to the first processing direction along the central axis of the bearing base material. Thereafter, the dynamic pressure groove extending in the first processing direction is extended by continuously forming the substantially linear grooves in the first processing direction. In the case, a depth of the groove can be changed by controlling a driven amount of the cutting tool that performs a micro alternating drive in the second processing direction. That is, even if the radius of the housing hole portion is varied, it becomes possible that the variation in the radius can be readily followed, allowing a dynamic pressure groove having a certain depth or a desired depth to be formed. In addition, because the groove is manufactured by cutting process with the use of a cutting tool, an increase in processing resistance can be suppressed, and the processing resistance can be further controlled by adjusting a cut depth, if necessary, allowing deformation of the bearing base material to be suppressed. Further, a length of the substantially linear groove formed along the circumferential direction of the surface orthogonal to the first processing direction can be determined without changing the relative positions in the first processing direction of the bearing base material and the cutting tool, and hence the width of the dynamic pressure groove can be readily changed. Accordingly, even if the radius of the housing hole portion is varied, or even if the width or depth of the dynamic pressure grooves is changed, the dynamic pressure groove can be processed with the same cutting tool. Further, because the radius of the tip of the cutting tool can be sufficiently smaller than that of the ball in the ball-rolling process, allowing the dynamic pressure groove having a finer shape than that in the ball-rolling process to be readily formed.

In the circular fluid dynamic bearing, the inner circumferential surface of the housing hole portion of the bearing base material has preferably a taper in which the radius at both ends thereof is small and becomes gradually larger toward its center, for the purpose that a pressure at the intermediate portion thereof does not become lower than the atmospheric pressure. According to the embodiment, even if the inner circumferential surface of the housing hole portion is taper-shaped, the depth of the dynamic pressure groove can be readily adjusted such that the taper shape is followed, by changing an amount of the amplitude during the alternating drive.

The present invention should not be limited to the aforementioned embodiments, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A method of manufacturing a fluid dynamic bearing in which, by supporting a bearing base material having, at its center, a housing hole portion for a shaft capable of relative rotation and by rotating the bearing base material around the central axis thereof, the inner surface of the housing hole portion is cut with a cutting tool to form a dynamic pressure groove including a folded portion that defines a fluid discharging side, the method comprising:

forming a substantially linear groove having a length corresponding to a circumferential direction width of the dynamic pressure groove formed on the inner circumferential surface of the housing hole portion, along the circumferential direction of a surface orthogonal to a first processing direction along the central axis of the bearing base material, by the cutting tool that performs a micro alternating drive in a second processing direction orthogonal to the first processing direction, said forming of a substantially linear groove comprising progressively decreasing the groove depth of the linear groove corresponding to an area of the folded portion toward the fluid discharging side, and comprising forming the substantially linear groove to have a uniform depth in areas other than the area of the folded portion; and extending the dynamic pressure groove that extends in the first processing direction by continuously forming the substantially linear grooves in the first processing direction by displacing the relative positions of the bearing base material and the cutting tool in the first processing direction.

2. The method of manufacturing a fluid dynamic bearing according to claim 1, wherein the radius of the tip of the cutting tool is 0.02 mm to 0.1 mm.

3. The method of manufacturing a fluid dynamic bearing according to claim 1, wherein a rotation speed while the bearing base material is being cut in the forming a substantially linear groove and the extending of the dynamic pressure groove, is determined between 1000 rpm and 5000 rpm.

4. A method of manufacturing a fluid dynamic bearing in which, by supporting a bearing base material having, at its center, a housing hole portion for a shaft capable of relative rotation and by rotating the bearing base material around the central axis thereof, the inner surface of the housing hole portion is cut with a cutting tool to form a dynamic pressure groove, the method comprising:

forming a substantially linear groove having a length corresponding to a circumferential direction width of the dynamic pressure groove formed on the inner circumferential surface of the housing hole portion, along the circumferential direction of a plane orthogonal to a first processing direction along the central axis of the bearing base material, by the cutting tool that performs a micro alternating drive in a second processing direction orthogonal to the first processing direction; and extending the dynamic pressure groove that extends in the first processing direction by continuously forming the substantially linear grooves in the first processing direction by displacing the relative positions of the bearing base material and the cutting tool in the first processing direction, wherein an area in the inner surface of the housing hole portion where the dynamic pressure groove is formed has a taper shape in which the radius at both end sides thereof is smaller than that on the inside thereof, and the cutting tool adjusts a depth of the extended dynamic pressure groove in accordance with an amount of the displacement in the first processing direction and a taper angle of the taper shape.

5. The method of manufacturing a fluid dynamic bearing according to claim 4, wherein the cutting tool adjusts the depth of the extended dynamic pressure groove by changing an amount of the amplitude during the alternating drive in the second processing direction, in accordance with the amount of the displacement in the first processing direction and the taper angle.

6. The method of manufacturing a fluid dynamic bearing according to claim 4, wherein the cutting tool is mounted on a tool table movable in the second processing direction, and the tool table adjusts the depth of the extended dynamic pressure groove by moving the cutting tool in the second processing direction, in accordance with a moving amount in the first processing direction and the taper angle.

7. The method of manufacturing a fluid dynamic bearing according to claim 6, wherein an amount of displacement in the second processing direction of the tool table is equal to or larger than 1.0 mm.

8. The method of manufacturing a fluid dynamic bearing according to claim 4, wherein the micro alternating drive in the second processing direction is performed with a piezo element being a drive source.

9. The method of manufacturing a fluid dynamic bearing according to claim 4, wherein the micro alternating drive in the second processing direction is controlled by using a driving voltage waveform having an approximately sinusoidal shape.

10. A method of manufacturing a Herringbone-shaped fluid dynamic bearing in which, by supporting a bearing base material having, at its center, a housing hole portion for a shaft capable of relative rotation and by rotating the bearing base material around the central axis thereof, the inner surface of the housing hole portion is cut with a cutting tool to form a dynamic pressure groove, the manufacturing method comprising:
    forming a substantially linear groove having a length corresponding to a circumferential direction width of the dynamic pressure groove formed on the inner circumferential surface of the housing hole portion, along the circumferential direction of a plane orthogonal to a first processing direction along the central axis of the bearing base material, by the cutting tool that performs a micro alternating drive in a second processing direction orthogonal to the first processing direction; and
    extending the dynamic pressure groove that extends in the first processing direction by continuously forming the substantially linear grooves in the first processing direction by displacing the relative positions of the bearing base material and the cutting tool in the first processing direction,
    wherein the extending of the dynamic pressure groove comprises forming a projection wing on the bottom surface of the dynamic pressure groove along the circumferential direction a plane orthogonal to the first processing direction;
    wherein a surface of the housing hole portion where the dynamic pressure groove is formed has a taper shape in which the radius at both end sides of bearing base material is smaller than that on the inside thereof, and the cutting tool adjusts a depth of the extended dynamic pressure groove by changing an amount of the amplitude during the alternating drive in the second processing direction in accordance with an amount of the displacement in the first processing direction and a taper angle of the taper shape.

11. The method of manufacturing a fluid dynamic bearing according to claim 10,
    wherein a surface of the housing hole portion where the dynamic pressure groove is formed has a taper shape in which the radius at both end sides of bearing base material is smaller than that on the inside thereof, the cutting tool is mounted on a tool table movable in the second processing direction, and the tool table adjusts a depth of the extended dynamic pressure groove by moving the cutting tool in the second processing direction, in accordance with a moving amount in the first processing direction and a taper angle of the taper shape.

12. The method of manufacturing a fluid dynamic bearing according to claim 10, wherein the radius of the tip of the cutting tool is 0.02 mm to 0.1 mm.

13. The method of manufacturing a fluid dynamic bearing according to claim 10, wherein the micro alternating drive in the second processing direction is performed with a piezo element being a drive source.

14. The method of manufacturing a fluid dynamic bearing according to claim 10, wherein the micro alternating drive in the second processing direction is controlled by using a driving voltage waveform having an approximately sinusoidal shape.

15. A method of manufacturing a fluid dynamic bearing in which, by supporting a bearing base material having, at its center, a housing hole portion for a shaft capable of relative rotation and by rotating the bearing base material around the central axis thereof, the inner surface of the housing hole portion is cut with a cutting tool to form a dynamic pressure groove, the manufacturing method comprising:
    forming a substantially linear groove having a length corresponding to a circumferential direction width of the dynamic pressure groove formed on the inner circumferential surface of the housing hole portion, along the circumferential direction of a plane orthogonal to a first processing direction along the central axis of the bearing base material, by the cutting tool that performs a micro alternating drive in a second processing direction orthogonal to the first processing direction; and
    extending the dynamic pressure groove that extends in the first processing direction by continuously forming the substantially linear grooves in the first processing direction by displacing the relative positions of the bearing base material and the cutting tool in the first processing direction,
    wherein the forming of a substantially linear groove comprises the micro alternating drive in the second processing direction with a piezo element driven by a drive signal being a drive source, and comprises detecting a rotational reference position and an angle of rotation of the bearing base material and controlling at least one of a period and a phase of the drive signal in accordance with the detected rotational reference position and angle of rotation.

16. The method of manufacturing a fluid dynamic bearing according to claim 15, wherein the forming of the substantially linear groove comprises detecting a position of the cutting tool, and controlling at least one of the period and the phase of the drive signal in accordance with the detected position of the cutting tool.

17. The method of manufacturing a fluid dynamic bearing according to claim 15, wherein the forming of the substantially linear groove comprises detecting the rotational reference position of the bearing base material in every one rotation by counting an output signal from an encoder for detecting the angle of rotation of the bearing base material.

18. The method of manufacturing a fluid dynamic bearing according to claim 15, wherein a rotation speed while the bearing base material is being cut in the forming of the substantially linear groove and the extending of the dynamic pressure groove, is determined between 1000 rpm and 5000 rpm.

19. The method of manufacturing a fluid dynamic bearing according to claim 15, wherein the micro alternating drive in the second processing direction is controlled by using a driving voltage waveform having an approximately sinusoidal shape.

* * * * *